US009414605B2

United States Patent
Le Paih et al.

(10) Patent No.: US 9,414,605 B2
(45) Date of Patent: Aug. 16, 2016

(54) MACHINE FOR SHAPING PORTIONS OF FOOD PRODUCT WITH INTERLEAVING PAPER APPLYING DEVICE

(75) Inventors: Jacques Le Paih, Plumeliau (FR);
Adrianus Van Den Nieuwelaar, Gemert (NL); Léon Spierts, Maastricht (NL);
Sigebertus Meggelaars, Eindhoven (NL); Robert Conklin, Dacula, GA (US)

(73) Assignee: MAREL FRANCE, Baud (FR)

(*) Notice: Subject to any disclaimer, the term of this patent is extended or adjusted under 35 U.S.C. 154(b) by 0 days.

(21) Appl. No.: 13/825,289

(22) PCT Filed: Sep. 19, 2011

(86) PCT No.: PCT/EP2011/066244
§ 371 (c)(1),
(2), (4) Date: Mar. 20, 2013

(87) PCT Pub. No.: WO2012/038381
PCT Pub. Date: Mar. 29, 2012

(65) Prior Publication Data
US 2013/0186569 A1    Jul. 25, 2013

(30) Foreign Application Priority Data

Sep. 20, 2010 (FR) .................................. 10 57486

(51) Int. Cl.
A22C 7/00      (2006.01)
A22C 17/00    (2006.01)

(52) U.S. Cl.
CPC ................. *A22C 7/00* (2013.01); *A22C 7/0069* (2013.01); *A22C 7/0076* (2013.01); *A22C 7/003* (2013.01); *A22C 17/0093* (2013.01)

(58) Field of Classification Search
CPC ...... A22C 17/0093; A22C 7/003; A22C 7/00; A22C 7/006; A22C 7/00769
USPC ............ 425/89, 121, 126.1, 123, 124; 426/89
See application file for complete search history.

(56) References Cited

U.S. PATENT DOCUMENTS

| 2,146,786 | A | * | 2/1939 | Baker ............................ 425/357 |
| 2,774,313 | A | * | 12/1956 | Lombi ........................... 99/450.2 |
| 2,781,272 | A | * | 2/1957 | Rudnik et al. ................. 426/420 |
| 2,813,033 | A | * | 11/1957 | Schneider ..................... 426/392 |
| 2,949,713 | A | * | 8/1960 | Vogt ................................. 53/453 |
| 3,050,017 | A | * | 8/1962 | Mahler ........................... 426/275 |

(Continued)

FOREIGN PATENT DOCUMENTS

| GB | 965468 A | 7/1964 |
| GB | 2192866 A | 1/1988 |
| GB | 2259043 A | 3/1993 |

*Primary Examiner* — Seyed Masoud Malekzadeh
(74) *Attorney, Agent, or Firm* — Zarley Law Firm, P.L.C.

(57) ABSTRACT

This invention relates to a machine for shaping three-dimensional portions of food product, in particular meat, in particular for shaping portions of minced meat, provided with an interleaving paper applying device, as well as a corresponding paper applying device. The machine comprises a shaping device (1) with shaping cells (2) wherein are shaped portions (S) of food product, and a paper applying device (3) comprising an applying drum (4) provided with on its peripheral cylindrical surface (41) at least one paper applying system (5) in order to take and maintain papers (9) on its peripheral surface and apply them on the portions placed in the shaping cells. The machine also has drives the cells and applying drum in synchronism.

11 Claims, 4 Drawing Sheets

(56) References Cited

U.S. PATENT DOCUMENTS

| | | | | |
|---|---|---|---|---|
| 3,137,029 A | * | 6/1964 | De Zolt | 425/218 |
| 3,433,181 A | * | 3/1969 | Steins | 425/89 |
| 3,771,938 A | * | 11/1973 | Pinto et al. | 425/174.4 |
| 3,952,478 A | * | 4/1976 | Richards et al. | 53/122 |
| 3,978,642 A | * | 9/1976 | Smithers | 53/531 |
| 3,991,168 A | * | 11/1976 | Richards et al. | 426/420 |
| 4,282,258 A | * | 8/1981 | Forkner | 426/100 |
| 4,449,350 A | * | 5/1984 | Sanford | 53/412 |
| 4,710,117 A | * | 12/1987 | Haas et al. | 425/126.1 |
| 4,874,456 A | * | 10/1989 | Takagi | 156/471 |
| 5,045,148 A | * | 9/1991 | Hoffstetter et al. | 156/567 |
| 5,051,268 A | * | 9/1991 | Mally | 426/420 |
| 5,174,431 A | * | 12/1992 | Abler | 198/428 |
| 5,286,507 A | * | 2/1994 | Abler | 426/420 |
| 5,391,386 A | * | 2/1995 | Mally | 426/420 |
| 5,716,658 A | * | 2/1998 | Donnelly et al. | 426/420 |
| 5,752,364 A | * | 5/1998 | Benham et al. | 53/435 |
| 5,846,588 A | * | 12/1998 | Zimmermann et al. | 426/420 |
| 5,935,613 A | * | 8/1999 | Benham et al. | 425/89 |
| 6,811,802 B2 | * | 11/2004 | van Esbroeck et al. | 426/512 |
| 7,159,372 B2 | * | 1/2007 | Lindee et al. | 53/157 |
| 7,284,973 B2 | * | 10/2007 | van Esbroeck et al. | 425/89 |
| 7,597,549 B2 | * | 10/2009 | van Esbroeck et al. | 425/89 |
| 7,677,880 B2 | * | 3/2010 | Moore et al. | 425/324.1 |
| 8,029,841 B2 | * | 10/2011 | Van Esbroeck et al. | 426/389 |
| 8,080,271 B2 | * | 12/2011 | Langton et al. | 426/420 |
| 8,337,919 B2 | * | 12/2012 | Theisen et al. | 426/132 |
| 8,367,129 B2 | * | 2/2013 | Van Esbroeck et al. | 426/89 |
| 2002/0180076 A1 | * | 12/2002 | Motz | 264/33 |
| 2009/0087530 A1 | | 4/2009 | Miller | |
| 2010/0055272 A1 | * | 3/2010 | Van Esbroeck et al. | 426/389 |
| 2011/0001263 A1 | * | 1/2011 | Bonnier | 264/265 |

\* cited by examiner

MACHINE FOR SHAPING PORTIONS OF FOOD PRODUCT WITH INTERLEAVING PAPER APPLYING DEVICE

BACKGROUND OF THE INVENTION

This invention relates to a machine for shaping three-dimensional portions of food product, in particular meat, in particular for shaping portions of minced meat, provided with a interleaving paper applying device, as well as a corresponding interleaving paper applying device.

Machines for shaping three-dimensional portions of food product are known comprising a shaping device making it possible to continuously shape in shaping cells portions of food product using a mass of food product, for example delivered by a mincer, each cell comprising a bottom wall and a lateral wall, said shaping cells moving continuously.

The shaping device can include a shaping drum mounted rotatingly on a chassis around an axis of rotation, and having on its cylindrical peripheral surface shaping cells, said drum being provided with supply means in order to supply each cell with food product on a supply station and ejecting means in order to eject each shaped portion outside of the cell on an portion unloading station. At the output of the shaping device, the shaped portions are recovered on the upper strand of a conveyer.

In the case of the manufacture of minced steaks, the latter can be stacked on one another. In order to facilitate the later unstacking of the minced steaks, in particular in the case of frozen minced steaks, the minced steaks are placed in a stack with interleaving sheets or papers placed between them.

To do this, the machine can be provided with an interleaving paper applying system in order to apply a paper on each shaped portion. It has been proposed, in particular in U.S. Pat. No. 3,137,029, a paper applying system comprising a stack of paper arranged in the vicinity of the shaping drum in a tray, also called an unstacker, in such a way that each shaped portion takes a paper when passing on the unstacker. Such a paper applying system is rather inaccurate, and does not guarantee the applying of a paper on each portion.

SUMMARY OF THE INVENTION

The purpose of this invention is to propose a solution aiming to overcome the aforementioned disadvantages.

To this effect, this invention proposes a shaping machine for the shaping of three-dimensional portions of food product, in particular meat, in particular for shaping portions of minced meat, said machine comprising
  a shaping device comprising one or several shaping cells or cavities wherein are shaped portions of food product, each cell comprising a bottom wall and a lateral wall, said shaping cells moving continuously, and
  a paper applying device in order to apply an interleaving sheet or paper on each shaped portion,
  characterised in that said paper applying device comprises an applying drum provided with on its cylindrical peripheral surface at least one paper applying system in order to take and maintain papers on its peripheral surface and apply them on the shaped portions placed in the shaping cells, said machine comprising driving means in order to drive in synchronism, and more preferably continuously, the shaping cells and the applying drum, in such a way that the applying drum applies a paper on each portion arranged in a shaping cell at an application station.

According to the invention, the papers are applied on the portions by the intermediary of an applying drum, while the portions are still arranged, at least partially, in the cells. The drum is provided with paper applying systems in order to take the papers at a paper taking station, and to maintain them on the drum until they are applied on the portions. Such an applying drum operating in synchronism with the shaping cells provides an accurate and safe positioning of the papers on the portions, at a high rate, without harmful compacting of the portions for the application of papers.

The driving means provide a synchronisation between the displacement of the shaping cells and the displacement of the applying drum, with this synchronisation able to be mechanical, electronic or hydraulic.

The applying paper system or systems for applying papers from the applying drum can include vacuuming means in order to take via suction the papers and/or mechanical means, for example of the clamp or analogous type, in order to mechanically take the papers.

According to an embodiment,
  the shaping device comprises a shaping drum mounted rotatingly on a chassis around an axis of rotation, for example substantially horizontal, and having on its cylindrical peripheral surface said shaping cells, said drum being provided with supply means in order to supply each cell with product and ejecting means in order to eject each shaped portion outside of the cell on an portion unloading station,
  said applying drum being mounted rotatingly on the chassis around an axis of rotation parallel to the axis of rotation of the shaping drum,
  said driving means being able to drive in rotation and in synchronism the shaping drum and the applying drum, the synchronisation being obtained mechanically, electronically or hydraulically.

According to an embodiment, said paper applying system comprises one or several suction orifices able to be placed into fluid communication with vacuuming means, in order to take and maintain through suction papers on the peripheral surface, and to apply them on the portions placed in the shaping cells by cutting off their fluid communication with the vacuuming means. Each suction orifice is advantageously surrounded by a suction seal, of an elastomer material, housed in an annular groove arranged on the cylindrical peripheral surface of the applying drum.

According to an embodiment, the paper applying device comprises at least one paper unstacker able to receive a stack of paper, with the suction orifice or orifices of a paper applying system being placed into communication with the vacuuming means in order to take via suction the first paper from the stack. Advantageously, each unstacker comprises a guide rod whereon are able to be threaded papers provided with holes. The paper applying device allows for the applying of papers without holes, or paper with holes when the unstacker comprises a guide rod.

According to another embodiment, said paper applying system comprises
  an annular blade mounted on the peripheral surface of the applying drum, the blade carrying out the taking and the maintaining of the paper by cutting said paper in a continuous sheet moving on a feed roller, said feed roller being driven in rotation, in synchronism with the applying drum by the driving means the machine, and
  a pusher slidably mounted on the applying drum, inside the annular blade, able to be displaced radially from a retracted position to a deployed position in order to apply the paper on the portion placed in the cell.

According to an embodiment, the paper applying device comprises transferring means, guaranteeing the transfer of papers from the applying drum on the portions placed in the cells, by bringing or laying flat the papers against the portions.

According to another embodiment, said transferring means include said pusher or said pushers.

According to an embodiment, the transferring means include a comb, mounted fixed on the chassis of the machine, of which the teeth are able to pass under the paper at the application station in order to bring said paper against the portion.

According to another embodiment, said transferring means include at least one orifice associated with each paper applying system, arranged on the peripheral surface of the applying drum, able to be placed into fluid communication with a fluid under pressure for the injection of fluid under pressure at the application station.

According to another embodiment, said applying drum comprises several paper applying systems, the paper applying device comprises advantageously mounting/dismounting means making it possible to rapidly mount and dismount an applying drum on the machine and/or said applying drum comprises adjusting means for adjusting paper applying systems, in order to adapt the applying drum to the shaping drum used, the adjusting means being able to act on the positioning of the paper applying systems or on the activation or not of paper applying systems, the machine comprising for example interchangeable shaping drums.

This invention also has for object a paper applying device for a shaping machine for shaping three-dimensional portions of food product, characterised in that it comprises an applying drum provided with on its cylindrical peripheral surface at least one paper applying system in order to take and maintain papers on its peripheral surface and apply them on portions of food product, and transferring means, guaranteeing the transfer of papers from the applying drum on the portions, by bringing or laying flat the papers against the portions.

The paper applying system can include suction orifices or an annular blade associated with a pusher, such as described previously.

The transferring means can include a comb, one or several orifices for the injection of a fluid under pressure, or a pusher of the paper applying system.

The paper applying devices can be used to apply the papers on the portions positioned at least partially in the cells, such as described previously, or in order to apply the papers on the portions at the output of the shaping device, for example on the portions moving on the upper strand of a conveyer.

BRIEF DESCRIPTION OF THE FIGURES

The invention shall be better understood, and other purposes, details, characteristics and advantages shall appear more clearly in the following detailed explanatory description of two currently preferred particular embodiments of the invention, in reference to the annexed diagrammatical drawings, wherein.

DETAILED DESCRIPTION OF THE PREFERRED EMBODIMENTS

In the embodiment shown in FIGS. 1 to 9, the shaping device of the machine comprises a shaping drum 10 provided with on its cylindrical peripheral surface shaping cells 2 of which the shape corresponds to the shape of the desired three-dimensional portions. In a manner known per se, the drum is provided with supply means in order to supply each cell with product at a supply station, as well as ejecting means in order to eject each shaped portion outside of the cell on an portion unloading station. These ejecting means are for example formed of channels arranged in the shaping drum and opening onto the bottom wall of the cells, with these channels being used to inject compressed air at the unloading station in order to eject the portions. Only the shaping drum provided with its cells is shown in the figures. For more details on such a shaping system with shaping drum, reference can be made for to patent EP 1 744 635 B1.

Figure 1:
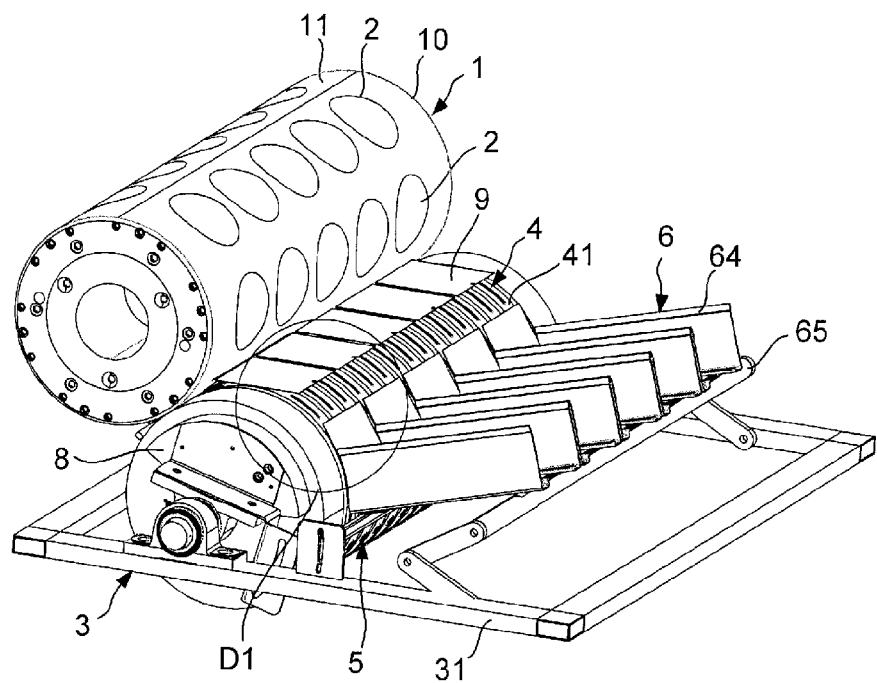
FIGS. 1 and 2 are two perspective views of the shaping drum and of the paper applying device of a shaping machine according to a first embodiment of the invention.
Figure 2:
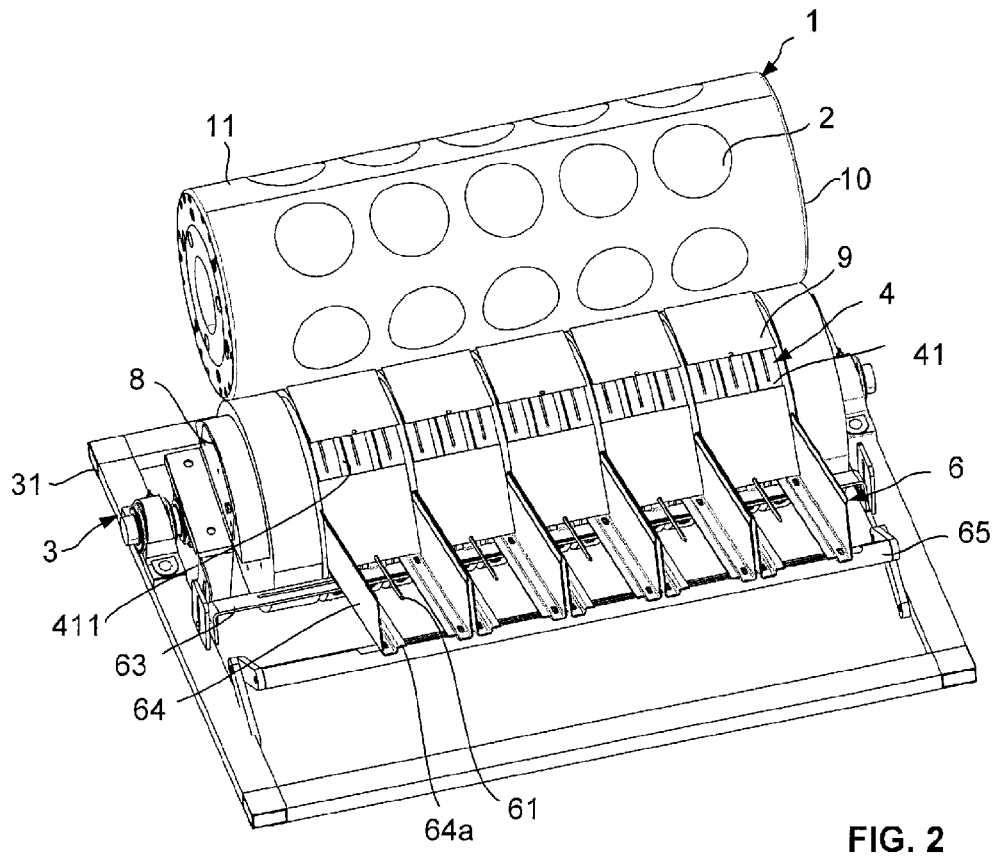
Figure 3:
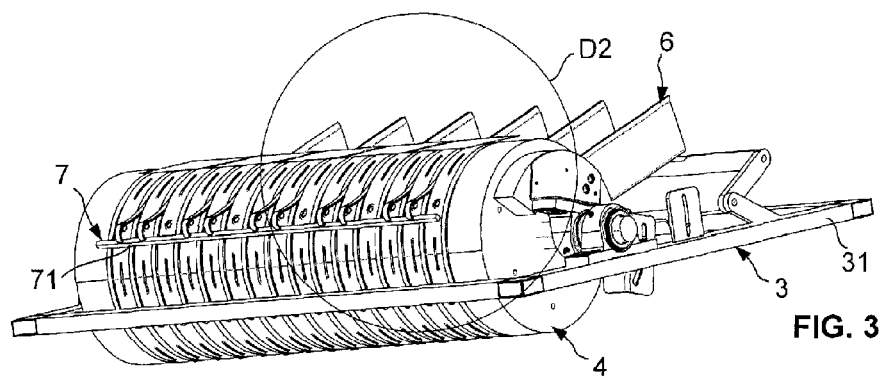
FIG. 3 is a perspective view of the interleaving paper applying system of FIGS. 1 and 2.
Figure 4:
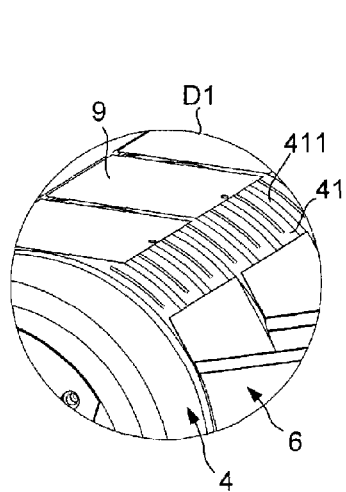
FIG. 4 is an enlarged view of the detail D1 of FIG. 1.
Figure 5:
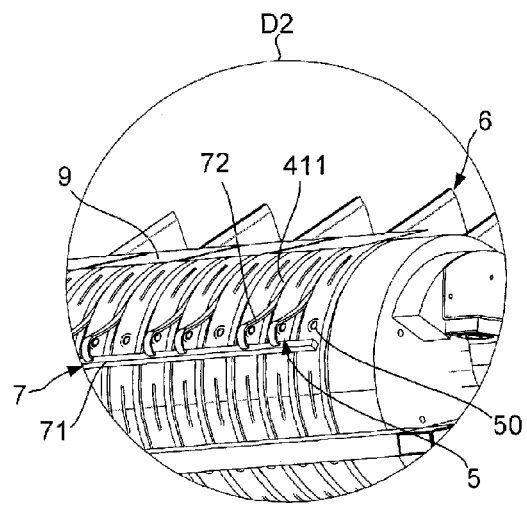
FIG. 5 is an enlarged view of the detail D2 of FIG. 3.
Figure 6:
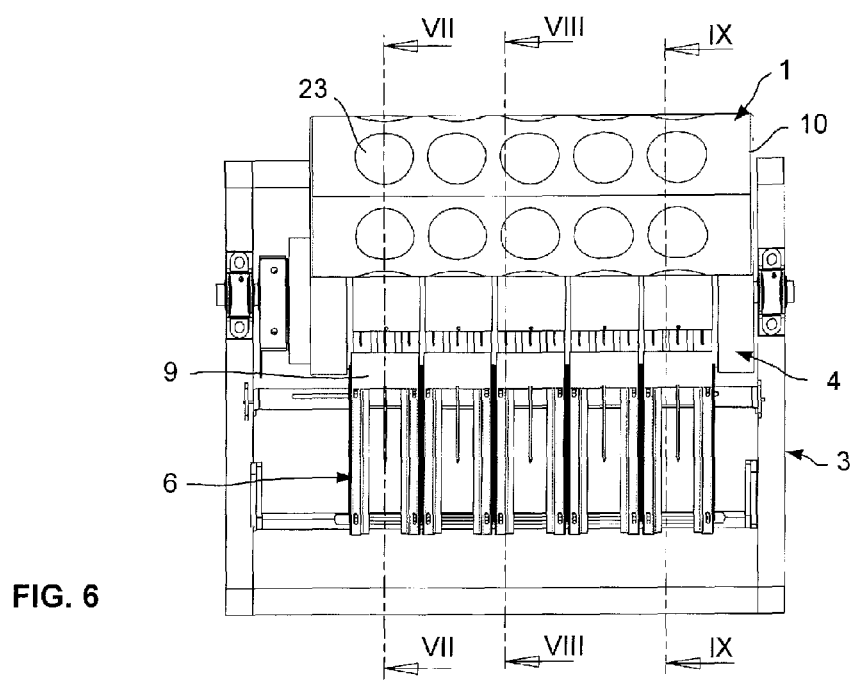
FIG. 6 is a top view of the shaping machine of FIGS. 1 and 2.
Figure 7:
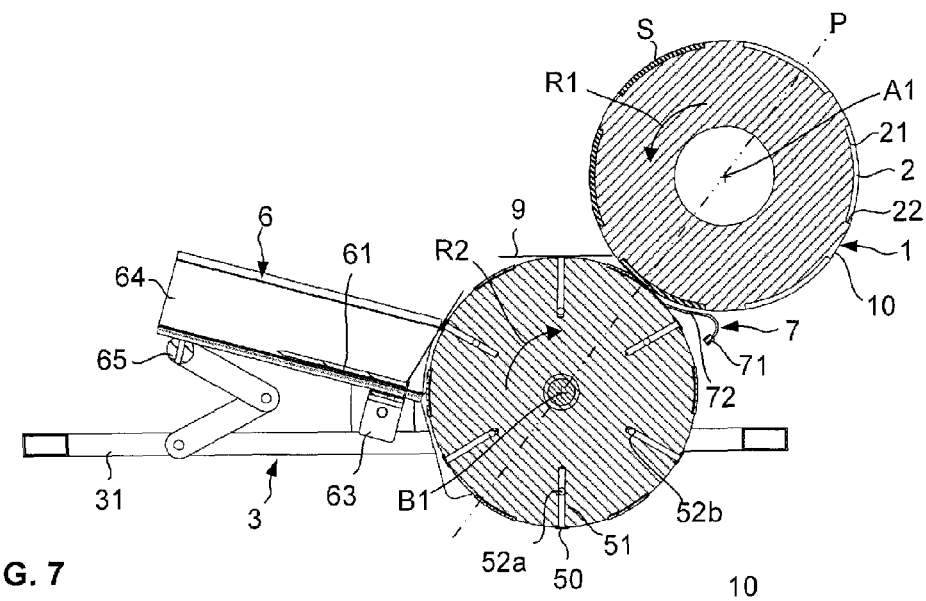
FIGS. 7, 8 and 9 are respectively cross-section views according to the cutting planes VII-VII, VIII-VIII and IX-IX of FIG. 6.

In reference to FIG. 7, the shaping drum 10 is mounted rotatingly on the chassis (not shown) of the shaping device, around an axis A1 of rotation, substantially horizontal. Each cell comprises a bottom wall 21 and a lateral wall 22. The drum has cells distributed at a regular angular spacing along one or several circular lines or rows. When the drum has several circular rows of cells, the cells of two successive rows can be angularly offset from one another or aligned longitudinally according to a longitudinal line, also called a generatrix. In this embodiment, the cells are provided for the shaping of minced steaks S. The drum has five circular rows, regularly offset from each other along the axis A1 of the drum, each circular row comprising six cells, the cells of the rows being aligned according to six generatrixes. Advantageously, the shaping machine comprises mounting/dismounting means for mounting/dismounting the shaping drum making it possible to rapidly change shaping drums according to the portions to shape.

Rotation driving means (not shown) are associated with said shaping drum 10 in order to drive in a direction R1 of rotation.

The shaping machine is provided with a paper applying device 3 for making it possible to apply papers 9 on the portions S placed in the cells 2 of the shaping drum, when the cells are displaced between the supply station and the unloading station.

The paper applying device comprises an applying drum 4 mounted rotatingly on a chassis 31 around an axis B1 of rotation (FIG. 7), said chassis 31 of the paper applying device being mounted on the chassis (not shown) of the machine in such a way that the axis B1 of rotation of the applying drum is parallel to the axis A1 of rotation of the shaping drum, the peripheral surface 41 of the applying drum being arranged in the immediate vicinity of that 11 of the shaping drum, more preferably without contact between them.

The applying drum 4 is provided with on its cylindrical peripheral surface 41 with applying paper systems 5 in order to take papers 9 at a taking station, maintain them on its peripheral surface until the application station, defined in the zone wherein the two drums are in the immediate vicinity of each other. In reference to FIG. 5, each system comprises one or several suction orifices 50 placed into fluid communication with vacuuming means, such as a vacuum pump, according to their angular position, via a suction cam 8.

Figure 8:
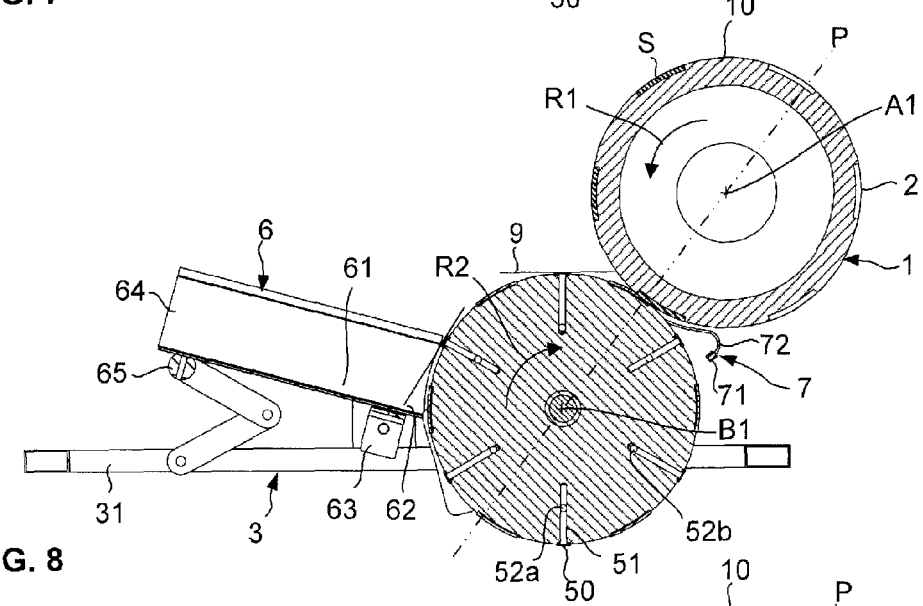
Figure 9:
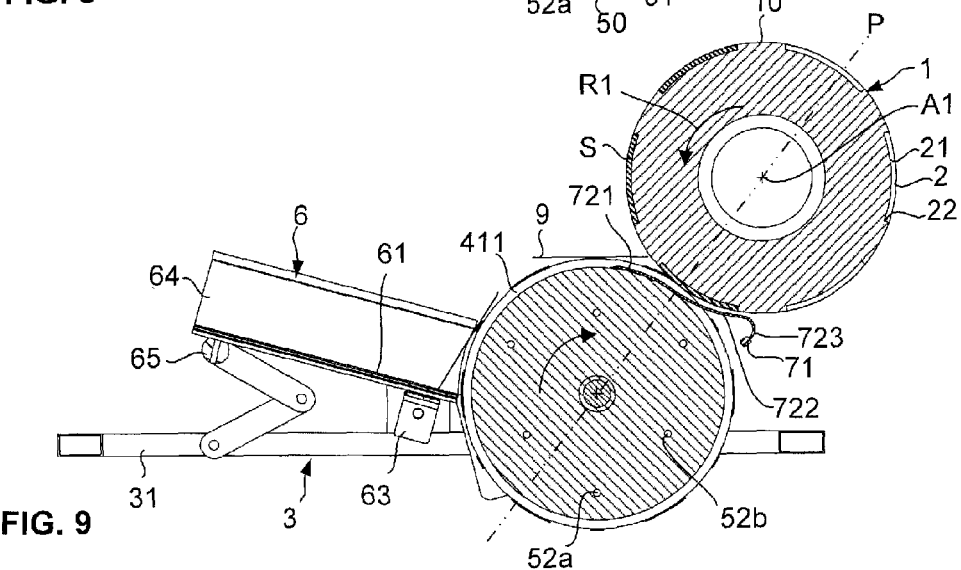

According to FIG. 8, each suction orifice 50 is formed by a radial channel 51 arranged in the applying drum and opening onto the peripheral surface 41 via a circular opening. This radial channel is connected to a longitudinal channel 52a, 52b opening onto one of the two lateral walls of the applying drum. The suction cam comprises a plate which is mounted fixed on the chassis 31, and which comes via a first face against said lateral wall, in a sealed manner, by means of a rotating seal. Said plate is provided with at least one groove in the shape of an arc of circle, connected to the vacuum pump, and whereon open the longitudinal channels according to their angular position.

In this embodiment, the diameters of the drums are substantially identical, and the applying drum is driven in rotation by driving means, in a direction R2 of rotation opposite the direction R1, in such a way that the two drums rotate substantially in isovelocity. In these conditions, the applying drum comprises paper applying systems 5 of which the number and the position on the surface 41 correspond to those of cells on the shaping drum. The paper applying systems are as such arranged on the applying drum according to five circular rows and according to six generatrixes. Each paper applying system comprises three suction orifices 50 aligned longitudinally, each orifice is formed by a radial channel 51. The radial channels of the paper applying systems of a same generatrix are connected to a same longitudinal channel, which comes across from a groove in the shape of an arc of circle of the suction cam 8 according to the angular position of the applying drum. The applying drum makes it possible to place in a vacuum at the same time the suction orifices of two successive generatrixes. More preferably the putting in a vacuum of the orifices of two successive generatrixes is carried out with separate vacuuming means. To do this, the suction cam 8 comprises two grooves in the shape of an arc of circle, extending over the same arc of a circle, but with different radiuses, each groove being connected independently from one another to the vacuum pump. For two successive generatrixes of suction orifices, the suction orifices of a first generatrix are connected by a first channel 52a to a first groove, the orifices of the second generatrix being connected by a second canal 52b to the second groove.

Each suction hole is advantageously surrounded by a suction seal, of an elastomer material, housed in an annular groove arranged on the peripheral surface 41 of the applying drum 4.

At the taking station, the paper applying device comprises trays 6, also called unstackers, for the receiving of the stacks of papers, with these unstackers being offset longitudinally and their number corresponds to the number of rows of the paper applying systems.

Each unstacker comprises a guide rod 61 fixed by a first end, via a prong 62 (FIG. 7), to a first longitudinal bar 63 mounted on the chassis 31 parallel to the axis B1, the rod 61 being arranged perpendicularly to the axis B1. The papers 9 are each provided with a hole in the vicinity of an edge, and are threaded onto the rod 61 by the free end of the latter. In order to laterally guide the stack of paper, the unstacker comprises two guide plates 64 mounted, on either side of the rod 61 on the first bar 63 and a second longitudinal bar 65. The plates 64 have edges 64a at a right angle via which they are fixed between the two longitudinal bars 63, 65, the papers resting via their edge against said edges of the plates. The rods of the unstackers are inclined in relation to the horizontal in such a way that the papers come naturally against the peripheral surface of the drum by their portion that is opposite their hole. The two longitudinal bars are advantageously mounted in an adjustable manner on the chassis in order to be able to adjust the angle of the rod in relation to the applying drum, for example according to the nature and the size of the paper to apply.

The paper applying systems are placed in a vacuum from the taking station to the application station. When a paper applying system 5 passes in front of an unstacker 6, its suction orifices 50 are in communication with the vacuum pump in order to take via suction the first paper from the stack of paper placed in the unstacker. The suction orifices provided with their seal allow for a very good taking of the paper and pulling it off of the guide rod. The guide rod, from which the papers must be pulled off, makes it possible in the case of fine paper to grasp only a single paper at a time. The placing in a vacuum of the suction orifices is carried out when their seals are in contact with the papers, and the drums are synchronised in such a way that the papers are grasped substantially in their middle. The placing in a vacuum is maintained in order to carry the paper to the application station and present it in front of a cell of the shaping drum. The suction is then cut off, the paper sticks to the portion S positioned in the cell.

The drums 10, 4 are synchronised in such a way that a paper applying system 45 is centred on the plane P (FIG. 7) passing through the axes A1 and B1, when a cell is centred on said plane P. The suction of a paper applying system is cut off when the paper applying system is centred according to said plane, i.e. when its three suction orifices 50 are substantially arranged according to said plane.

The applying drum makes it possible to continuously unstack interleaving papers from the unstackers and to apply them on the portions. The operation in synchronism of the two drums, and in particular in isovelocity, makes it possible to obtain high rates, for example of a magnitude of 200 products/minute in the case of the shaping drum shown comprising thirty cells.

More preferably, the paper applying device further comprises transferring means, also called means for laying flat, in order to guarantee the transfer of the papers from the applying drum on the portions. In reference to FIGS. 3, 5 and 9, the transferring means include a comb 7 comprising a bar 71 mounted on the chassis, parallel to the axes A1, B1, carrying several teeth or rods 72, for example of rectangular section. Each rod 72 comprises a first end portion 721 in an arc of a circle coming to be housed in circular grooves 411 arranged on the peripheral surface 41 of the applying drum 4. These end portions are extended by a second intermediary portion 722 in the arc of a circle, of which the curvature is inverted in relation to the curvature of the end portion 721, and which extend substantially in parallel to the peripheral surface 11 of the shaping drum 10, in the immediate vicinity of the latter. These intermediary portions 722 are extended by a third curved portion 732, extending towards the exterior from the peripheral surface 11, through which the rods are fixed to the bar 71 of the comb.

The end portions 721 can be pressing against the bottom of the grooves 411, while the intermediary portions 722 are arranged as close as possible to the shaping drum 10, but without contact with the latter.

With each row of paper applying systems 5 are associated two rods 72 of the comb, the end portions 721 of the two rods are housed in two circular grooves 411 each arranged between two suction orifices of each paper applying system of the row. When the paper 9 arrives on the application station, the end portions 721 pass under the paper and, once the suction is cut off, the intermediary portions 722 progressively separate the paper from the applying drum in order to bring it against the portions S.

By way of example, the two drums 10, 4 are driven by shared driving means guaranteeing a mechanical synchronisation of the two drums. The axis of the shaping drum is for example driven in rotation by a motor, and the shaping drum is integral in rotation with a wheel or lateral toothed crown which meshes with a wheel or lateral toothed crown integral in rotation with the applying drum, in order to drive in rotation the latter. Alternatively, the drums are driven in rotation by separate motors which are controlled by a control unit for an electronic synchronisation of the two drums.

The paper applying devices advantageously comprises mounting/dismounting means for making it possible to rapidly mount and dismount an applying drum on the chassis 31, in order to adapt the format of the applying drum to the format of the shaping drum used. Moreover, the applying drum can include adjusting means making it possible to adjust the gap between the circular rows of paper applying systems and/or the angular offset between the paper applying systems of two successive rows, for example by means of one or several lateral flaps, in order to adapt the positioning of the paper applying systems to that of the cells of the shaping drum. According to another alternative, the applying drum comprises a plurality of paper applying systems which can be deactivated or not by adjusting means according to the shaping drum used, for example a plurality of suction holes can be sealed off by the adjusting means. In this case, the applying drum can be adjustable only and no longer be removable.

Figure 10:
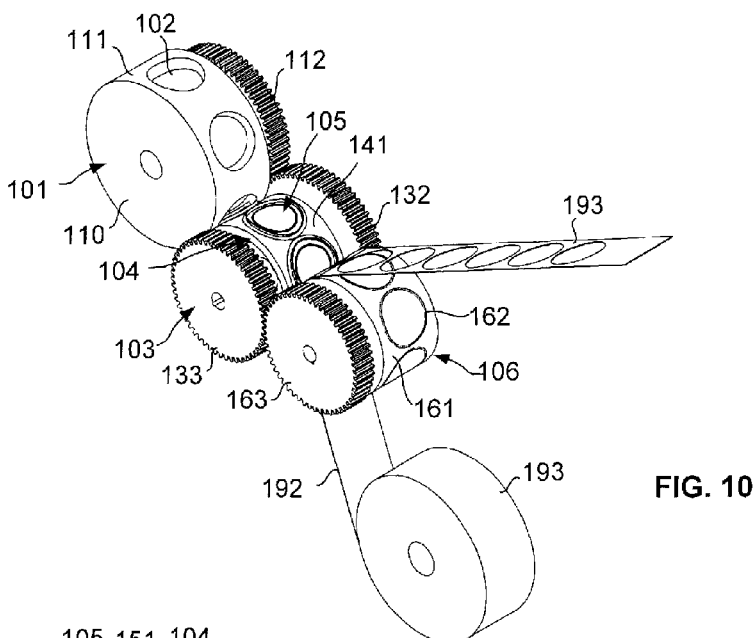
FIG. 10 is a perspective view of a shaping drum and of a paper applying device of a shaping machine according to a second embodiment of the invention.
Figure 11:
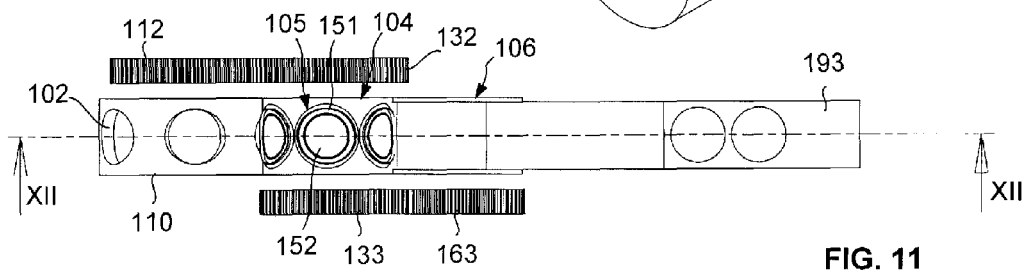
FIG. 11 is a top view of the shaping machine of FIG. 11.
Figure 12:
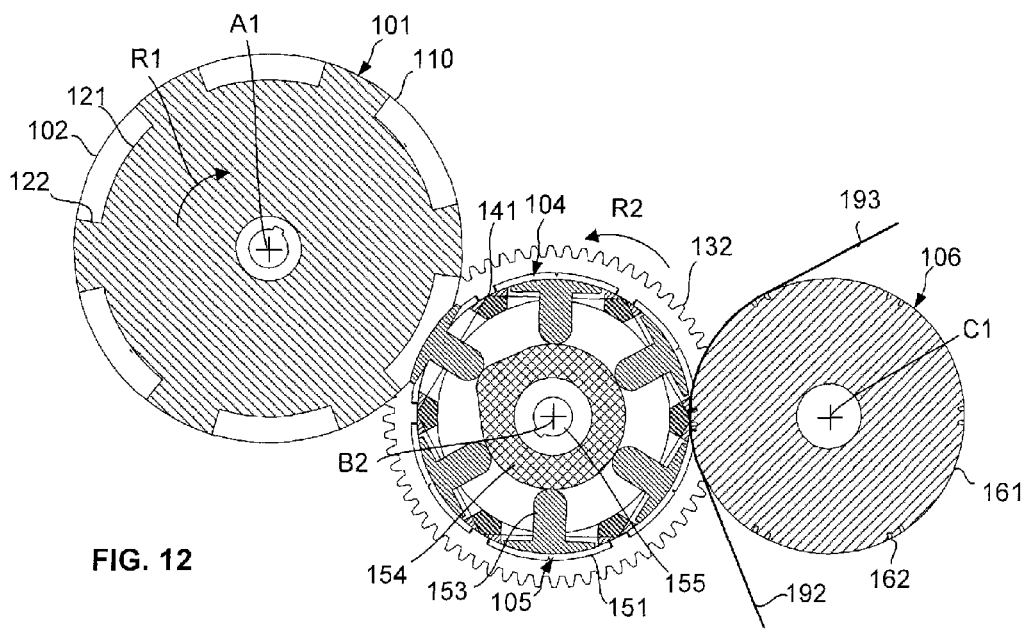
FIG. 12 is a partial view as a cross-section according to the cutting plane XII-XII of FIG. 11.

FIGS. 10 to 12 show a machine according to a second embodiment of the invention. The machine comprises a shaping device 101 comprising as previously a shaping drum 110 mounted rotatably on the chassis (not shown) of the shaping device, around an axis A2 of rotation, and provided with on its cylindrical peripheral surface 111 with shaping cells 102. Each cell comprises a bottom wall 121 and a lateral wall 122. The shaping drum here comprises cells 102 arranged at a regular angular spacing in a single row.

The shaping machine is provided with a paper applying device 103 comprising an applying drum 104 mounted rotatingly on a chassis around an axis B2 of rotation parallel to the axis A2, with the cylindrical peripheral surface 141 of the applying drum being arranged in the immediate vicinity of that 111 of the shaping drum, more preferably without contact between them.

The axis of the shaping drum 110 is driven in rotation by a motor in a direction R1 of rotation, and the shaping drum is integral in rotation with a lateral toothed wheel 112 which meshes with a first lateral toothed wheel 132 integral in rotation with the applying drum 104, in order to drive in rotation the latter in a direction R2 of rotation.

The applying drum 104 is provided with on its cylindrical peripheral surface 141 with a paper applying system 105 arranged with regular angular spacing on the peripheral surface in order to take papers at a taking station, maintain them on its peripheral surface until the application station, and apply them on the portions.

Each paper applying system here comprises an annular blade mounted on the peripheral surface 141, of which the cutting edge is protruding in relation to the peripheral surface. The blades cut papers in a continuous sheet 192 at a taking station. The sheet is unwound from a bobbin 191 on a feed roller 106. The feed roller is mounted rotatingly in the vicinity of the applying drum around an axis C1 of rotation parallel to the axes A2, B2, and rotates in synchronism with the two drums 104, 110. The applying drum is integral in rotation with a second lateral toothed wheel 133, opposite the first toothed wheel 132, which meshes with a toothed wheel 163 integral in rotation with the feed roller 106.

For the cutting, the blades 151 cut papers in the sheet 192 by being inserted into grooves 162, of a shape that is complementary to the blades, arranged on the cylindrical peripheral surface 161 of the feed roller 106. The blades 151 ensure the taking of the papers by cutting said papers in the continuous sheet, the cut papers then being maintained inside annular blades. At the output of the taking station, the sheet that has just been cut is recovered on a roller (not shown), which is driven in rotation in synchronism with the drums and the feed roller.

Each paper applying system 105 further comprises a piston or pusher 152 associated with the blade. The pusher is slidably mounted in a radial opening of the drum arranged in the centre of the annular blade. The pusher has a curved exterior surface 152a of which the radius of curvature corresponds substantially with the radius of curvature of the applying drum 104. Each pusher is integral with a rod 153 of which the free end is displaced along a came fixed on an axial rod 155, whereon the drum 104 is mounted in rotation, in order to radially displace the pusher, in a back-and-forth movement, between a retracted position wherein the exterior surface 152a of the pusher is substantially on the peripheral surface 141, and a deployed position wherein the surface of the pusher is arranged beyond the cutting edge of the blade 151. The shape of the cam is defined in such a way as to displace the pusher into its deployed position when the paper applying system is across from a cell in order to apply the paper on the portion placed in the cell. In deployed position, the pusher can penetrate slightly into the cell. In this embodiment, the pusher constitutes transferring means making it possible to bring the paper against the portion.

Although the invention has been described in connection with different particular embodiments, it is obvious that it is in no way limited to these and that it comprises all of the equivalent techniques of the means described as well as their combinations if the latter fall within the scope of the invention.

According to another embodiment, the paper applying devices 3, 103 described hereinabove can be associated with a shaping machine, such as described in patent EP 1 397 047. The paper applying device can be arranged in such a way as to apply a paper on the portion placed in a cell, of which the lateral wall is formed by the two indented blocks constituting the lateral shaping means, and of which the bottom wall is formed by the pusher constituting the vertical shaping means.

According to alternative embodiments, the paper applying devices 3, 103 are arranged in such a way as to apply the papers on the portions at the output of the shaping device, for example on the portions moving on the upper strand of a conveyer.

What is claimed:

1. Shaping machine for shaping of three-dimensional portions of food product, said machine comprising
    a shaping device (1, 101) comprising one or several shaping cells (2, 102) wherein portions (S) of food product are shaped, and
    a paper applying device (3, 103) in order to apply an interleaving paper (9) on each shaped portion,
    characterised in that said paper applying device (3, 103) comprises an applying drum (4, 104), substantially below the shaping cells (2, 102), provided with on the applying drum's cylindrical peripheral surface (41, 141), at least one paper applying system (5, 105) in order to take and maintain papers (9) on the applying drum's peripheral surface (41, 141), and apply the papers on the shaped portions placed in the shaping cells, said machine comprising driving means in order to drive in synchronism the shaping cells and the applying drum, in such a way that the applying drum applies a paper on each portion arranged in a shaping cell at an application station, and characterized in that the shaping device (1, 101) comprises a shaping drum (10, 110) mounted on a chassis around an axis (A1, A2) of rotation, and on the shaping drum's cylindrical peripheral surface (11, 111) having said shaping cells (2, 102), said applying drum being mounted on the chassis around an axis (B1, B2) of rotation parallel to the axis (A1, A2) of rotation of the shaping drum, said driving means being able to drive in rotation the shaping drum and the applying drum.

2. Shaping machine according to claim 1, characterised in that said paper applying system (5) comprises one or several suction orifices (50) able to be placed into fluid communication with vacuuming means, in order to take and maintain via suction papers (9) on the peripheral surface (41), and to apply them on the portions (S) placed in the shaping cells by cutting off their fluid communication with the vacuuming means.

3. Shaping machine according to claim 2, characterised in that the paper applying device (3) for applying paper comprises at least one paper unstacker (6) able to receive a stack of paper, the suction orifice or orifices (50) of a paper applying system being placed into communication with the vacuuming means in order to take via suction a next paper from the stack.

4. Shaping machine according to claim 3, characterised in that the at least one paper unstacker (6) comprises a guide rod (61) whereon are able to be threaded papers provided with holes.

5. Shaping machine according to claim 1, characterised in that said paper applying system (5) comprises an annular blade (151) mounted on the peripheral surface (141) of the applying drum (104), the blade carrying out the taking and the maintaining of the papers by cutting said papers in a continuous sheet (192) moving on a feed roller (106), said feed roller being driven in rotation, in synchronism with the applying drum by the driving means of the machine, and a pusher (152) slidably mounted on the applying, drum inside the annular blade (151), able to be displaced radially from a retracted position to a deployed position in order to apply the respective paper on the portion placed in the cell (102).

6. Shaping machine according to claim 1, characterised in that the device (5, 105) for applying papers comprises transferring means (7, 152), for transfer of papers from the applying drum on the portions placed in the cells, by bringing the papers against the shaped portions.

7. Shaping machine according to claim 5, characterised in that said transferring means include said pusher or said pushers (152).

8. Shaping machine according to claim 6, characterised in that the transferring means include a comb (7), of which the teeth (72) are able to pass under the paper at the application station in order to bring said paper against the portion.

9. Shaping machine according to claim 6, characterised in that said transferring means include at least one orifice associated with each paper applying system, arranged on the peripheral surface of the applying drum, able to be placed into fluid communication with a fluid under pressure for an injection of fluid under pressure at the application station.

10. Shaping machine according to claim 1, characterised in that the paper applying device comprises mounting/dismounting means for mounting and dismounting an applying drum on the machine.

11. Shaping machine according to claim 1, characterized in that said applying drum comprises adjusting means for adjusting paper applying systems, in order to adapt the applying drum to the shaping drum.

* * * * *